(12) United States Patent
Dweck et al.

(10) Patent No.: US 8,554,803 B2
(45) Date of Patent: Oct. 8, 2013

(54) SYSTEMS AND METHODS FOR FACILITATING ACCESS TO DOCUMENTS VIA A SET OF CONTENT SELECTION TAGS

(75) Inventors: Jay S. Dweck, Armonk, NY (US); Reha Elci, New York, NY (US)

(73) Assignee: Goldman, Sachs & Co., New York, NY (US)

( * ) Notice: Subject to any disclaimer, the term of this patent is extended or adjusted under 35 U.S.C. 154(b) by 28 days.

(21) Appl. No.: 13/211,436

(22) Filed: Aug. 17, 2011

(65) Prior Publication Data
US 2011/0302537 A1 Dec. 8, 2011

Related U.S. Application Data

(63) Continuation of application No. 10/016,673, filed on Oct. 30, 2001, now Pat. No. 8,028,001.

(51) Int. Cl.
*G06F 7/00* (2006.01)
*G06F 17/30* (2006.01)

(52) U.S. Cl.
USPC .................. 707/803; 707/829; 707/786

(58) Field of Classification Search
None
See application file for complete search history.

(56) References Cited

U.S. PATENT DOCUMENTS

| | | | |
|---|---|---|---|
| 5,408,655 A | 4/1995 | Oren et al. | |
| 5,502,637 A * | 3/1996 | Beaulieu et al. | 705/36 R |
| 5,568,640 A | 10/1996 | Nishiyama et al. | |
| 5,717,914 A * | 2/1998 | Husick et al. | 1/1 |
| 5,737,739 A * | 4/1998 | Shirley et al. | 715/207 |
| 5,864,871 A | 1/1999 | Kitain et al. | |
| 6,029,195 A | 2/2000 | Herz | |
| 6,055,543 A | 4/2000 | Christensen et al. | |
| 6,058,378 A | 5/2000 | Clark et al. | |
| 6,067,552 A | 5/2000 | Yu | |
| 6,098,066 A * | 8/2000 | Snow et al. | 1/1 |
| 6,175,830 B1 | 1/2001 | Maynard | |
| 6,266,682 B1 * | 7/2001 | LaMarca et al. | 715/234 |
| 6,282,547 B1 | 8/2001 | Hirsch | |
| 6,336,094 B1 | 1/2002 | Ferguson et al. | |

(Continued)

FOREIGN PATENT DOCUMENTS

| | | |
|---|---|---|
| EP | 0860763 A1 | 8/1998 |
| WO | WO-00/67162 A1 | 11/2000 |
| WO | WO-01/11559 A1 | 2/2001 |

OTHER PUBLICATIONS

Anick, Peter G. et al., "Adressing the Requirements of a Dynamic Corporate Textual Information Base," ACM, pp. 163-172, 1991.

(Continued)

*Primary Examiner* — Kuen Lu
(74) *Attorney, Agent, or Firm* — Perkins Coie LLP

(57) ABSTRACT

Systems and methods are provided to facilitate access to documents via a set of content selection tags. According to one embodiment, information is received from a content reader. For example, a content controller may receive information from a content reader via a Web site. A set of content selection tags are then established based on the received information, each content selection tag being associated with a hierarchical tag domain. It is then arranged for the content reader to receive an indication of a document tag in accordance with the set of content selection tags. For example, a content controller may retrieve one or more documents based on a set of content selection tags and document tags and transmit indications of the retrieved documents to a content reader via a Web site.

21 Claims, 13 Drawing Sheets

(56) References Cited

U.S. PATENT DOCUMENTS

| | | | |
|---|---|---|---|
| 6,356,903 B1 | 3/2002 | Baxter et al. | |
| 6,360,215 B1 | 3/2002 | Judd et al. | |
| 6,510,434 B1 * | 1/2003 | Anderson et al. | 1/1 |
| 6,598,046 B1 | 7/2003 | Goldberg et al. | |
| 6,735,585 B1 | 5/2004 | Black et al. | |
| 7,650,355 B1 * | 1/2010 | Davis | 715/234 |
| 2001/0016846 A1 | 8/2001 | Chakrabarti et al. | |
| 2001/0037317 A1 | 11/2001 | Freiwirth et al. | |
| 2001/0049675 A1 | 12/2001 | Mandler et al. | |
| 2002/0103822 A1 | 8/2002 | Miller | |
| 2002/0129062 A1 | 9/2002 | Luparello | |
| 2002/0138582 A1 | 9/2002 | Chandra et al. | |
| 2003/0110106 A1 | 6/2003 | Deshpande et al. | |
| 2004/0107125 A1 | 6/2004 | Guheen et al. | |
| 2005/0097017 A1 | 5/2005 | Hanratty | |

OTHER PUBLICATIONS

Chekuri, Chandra et al., "Web Searching Using Automatic Classification," Stanford University, 10 pages, 1996.

"Classification and Cataloging," http://www.nhse.org/docs/repo-planning/node6.html, 2 pages, 1996.

Damiani, Ernesto et al., "Design and Implementation of an Access Control Processor for XML Documents," Computer Networks, vol. 33, Nos. 1-6, pp. 59-75, Jun. 2000.

European Patent Application No. 02776129.5, Supplementary European Search Report, 3 pages, Jul. 25, 2006.

European Patent Application No. 02776130.3, Supplementary European Search Report, 3 pages, Jul. 24, 2006.

International Application No. PCT/US2002/031728, International Search Report, 1 page, Nov. 22, 2002.

International Application No. PCT/US2002/031729, International Search Report, 2 pages, Dec. 6, 2002.

International Application No. PCT/US2002/031731, International Search Report, 2 pages, Dec. 4, 2002.

Microsoft Corporation, "Microsoft Computer Dictionary," Fourth Edition, pp. 2 cover, 338, 374-375, 1999.

RIXML.org, "RIXML Specification Users Guide & Data Dictionary Report," Version 1.0, 76 pages, Jun. 20, 2001.

Skiena, Steven S., "The Algorithm Design Manual," Springer-Verlag, pp. 2 cover, 176-177, 1998.

"Tagging Concepts," http://www.siteserver101.com/book/chapter7/pm18.asp, 5 pages, 1999.

"Using Rules to Create Personalized Content," http://www.siteserver101.com/book/chapter7/pm19.asp, 4 pages, 1999.

* cited by examiner

| TAG IDENTIFIER 702 | DESCRIPTION 704 | PARENT TAG 706 |
|---|---|---|
| T-A1(1) | AUTHOR - ANALYST | T-A0 |
| T-A1(2) | AUTHOR - INVESTMENT ADVISOR | T-A0 |
| T-A2(1) | AUTHOR - INVESTMENT ADVISOR - RICK SHERLUND | T-A1(1) |
| T-A2(2) | AUTHOR - INVESTMENT ADVISOR - JANE GREENE | T-A1(1) |
| T-I1(1) | INDUSTRY - TECHNOLOGY | T-I0 |
| T-I1(2) | INDUSTRY - AUTOMOTIVE | T-I0 |
| T-I2(1) | INDUSTRY - TECHNOLOGY - SOFTWARE | T-I1(1) |
| T-C4(7) | COMPANY - US - TECHNOLOGY - SOFTWARE - MICROSOFT | T-C3(2) |

| DOCUMENT IDENTIFIER 802 | DESCRIPTION 804 | PRIMARY TAGS 806 | SECONDARY TAGS 808 |
|---|---|---|---|
| D1001 | "MICROSOFT 2002 Q3" | T-A2(1); T-C4(7); T-R2(6); T-R3(2) | T-I2(1); T-T1(4) |
| D1002 | "FORECAST CHART" | T-A43(6); T-T1(5) | NONE |
| D1003 | "KEYNOTE ADDRESS (VIDEO)" | T-A31(73) | T-T5(23) |

900

| SELECTION TAG SET IDENTIFIER 902 | CONTENT READER IDENTIFIER 904 | SELECTION TAGS 906 | DOCUMENT IDENTIFIERS 908 |
|---|---|---|---|
| STS-1001 | CR-1001 | T-A2(1) AND T-C4(7) | D1001 |
| STS-1002 | CR1-1001 | T-A2(2) AND T-C4(12) | D5010 |
| STS-1003 | CR-1002 | T-A2(1) OR T-A31(73) OR [T-T1(5) AND T-A31(73)] | D1001; D4300 |

SYSTEMS AND METHODS FOR FACILITATING ACCESS TO DOCUMENTS VIA A SET OF CONTENT SELECTION TAGS

CROSS REFERENCE TO RELATED APPLICATIONS

This application is a continuation of and claims priority under 35 U.S.C. §120 to U.S. patent application Ser. No. 10/016,673, filed on Oct. 30, 2001, entitled "Systems and Methods for Facilitating Access to Documents via a Set of Content Selection Tags," which in turn is related to U.S. patent application Ser. No. 10/016,674, filed on Oct. 30, 2001, entitled "SYSTEMS AND METHODS FOR FACILITATING ACCESS TO DOCUMENTS VIA ASSOCIATED TAGS." The entire contents of these applications are hereby incorporated by reference.

FIELD

The present invention relates to systems and methods for facilitating access to documents. In particular, the present invention relates to systems and methods for facilitating access to documents via a set of content selection tags.

BACKGROUND

A content provider can store information that will be made available to content readers. For example, a financial company might store hundreds of thousands of documents (e.g., investment reports, stock charts, and market predictions) that will be made available to customers via a Web site.

The content provider may also want to provide a content reader with information that will likely be of interest to that particular content reader. For example, one content reader may be interested in accessing documents associated with one industry while another content reader is interested in accessing documents associated with another industry.

To facilitate a content reader's ability to access information that will likely be of interest, it is known that an information can categorize information. For example, a content provider can associate a document with one or more "key" words. Similarly, a content provider can categorize information such that documents associated with one category (e.g., an "Automotive Industry" category) are associated with one branch of a directory structure while documents associated with another category (e.g., an "Airline Industry" category) are associated with another branch. In this way, a content reader can navigate through the directory structure and locate information that will likely be of interest.

There are a number of disadvantages, however, with these approaches. For example, a content reader may not be able to efficiently provide key words to the content provider (e.g., he or she might mistakenly request information associated with "US Corporations" as opposed to "US Companies") and/or be unable to effectively navigate through a directory structure to locate information that will likely be of interest (e.g., he or she may not realize that Daimler-Chrysler is associated with a "German Companies" directory as opposed to a "US Companies" directory). This may be particularly difficult when the information associated with investment research due to the large number of potential types of investments, the frequency at which this kind of information changes (e.g., daily, weekly, or occasionally), and the importance of providing such information to customers in a timely manner.

Moreover, a content reader's interests may not be easily categorized by simple key words and/or directory structures. For example, a content reader may only be interested in information about MICROSOFT® if the information was generated by a particular investment advisor. Similarly, a single content reader may be interested in a number of different types of information (e.g., associated with his or her different investments).

SUMMARY

To alleviate problems inherent in the prior art, the present invention introduces systems and methods for facilitating access to documents via a set of content selection tags.

According to one embodiment, information is received from a content reader. A set of content selection tags is established based on the received information, each content selection tag in the set being associated with a hierarchical tag domain. It is then arranged for the content reader to receive an indication of a document in accordance with the set of content selection tags.

According to still another embodiment, an indication of a first content selection tag set is received from a content reader via a graphical user interface, the first content selection tag set being adapted to facilitate identification of a first investment research document in accordance with a first document tag set. An indication of a second content selection tag set is also received from the content reader, and the second content selection tag set is adapted to facilitate identification of a second investment research document in accordance with a second document tag set. It is then arranged for an indication of the first investment research document to be displayed via a first portion of a content reader display and for an indication of the second investment research document to be displayed via a second portion of the content reader display.

According to yet another embodiment, information is transmitted to a content controller via a graphical user interface. An indication of a document is then received in accordance with a set of content selection tags established based on the transmitted information, each content selection tag in the set being associated with a hierarchical tag domain.

One embodiment of the present invention comprises: means for receiving information from a content reader; means for establishing a set of content selection tags based on the received information, each content selection tag in the set being associated with a hierarchical tag domain; and means for arranging for the content reader to receive an indication of a document in accordance with the set of content selection tags.

Still another embodiment of the present invention comprises: means for receiving from a content reader an indication of a first content selection tag set via a graphical user interface, the first content selection tag set being adapted to facilitate identification of a first investment research document in accordance with a first document tag set; means for receiving from the content reader an indication of a second content selection tag set, the second content selection tag set being adapted to facilitate identification of a second investment research document in accordance with a second document tag set; means for arranging for an indication of the first investment research document to be displayed via a first portion of a content reader display; and means for arranging for an indication of the second investment research document to be displayed via a second portion of the content reader display.

Yet another embodiment of the present invention comprises: means for transmitting information to a content controller via a graphical user interface; and means for receiving an indication of a document in accordance with a set of content selection tags established based on the transmitted information, each content selection tag in the set being associated with a hierarchical tag domain.

With these and other advantages and features of the invention that will become hereinafter apparent, the invention may be more clearly understood by reference to the following detailed description of the invention, the appended claims, and the drawings attached herein.

BRIEF DESCRIPTION OF THE DRAWINGS

FIG. 9 is a tabular representation of a portion of a selection tag set database according to one embodiment of the present invention.

DETAILED DESCRIPTION

Embodiments of the present invention are directed to systems and methods for facilitating access to "documents." As used herein, the term "document" may refer to any content that can be provided to a content reader via a communication network. A document may include, for example, text information, image information (e.g., photographic and video images), audio information, and/or executable information (e.g., a Java program). Note that a document's content could be manually or automatically created. For example, a document may be written by an author or generated by software program. In addition, a document's content could be associated with any type of information, including financial information (e.g., financial news and information about financial events), investment information, and/or market information.

Moreover, the phrase "content publisher" as used herein may be any person or device that generates or supplies documents. A content publisher may be associated with, for example, an author who writes a market summary or an automated process that generates investment charts. Similarly, the phrase "content reader" as used herein may be any person or device that receives documents. A content reader may be associated with, for example, a customer who accesses documents via an Internet portal. Note that a content "reader" may receive documents including any type of information described herein (e.g., a content reader may listen to audio information, view image information, and/or execute a Java program).

Content Management System Overview

Figure 1:
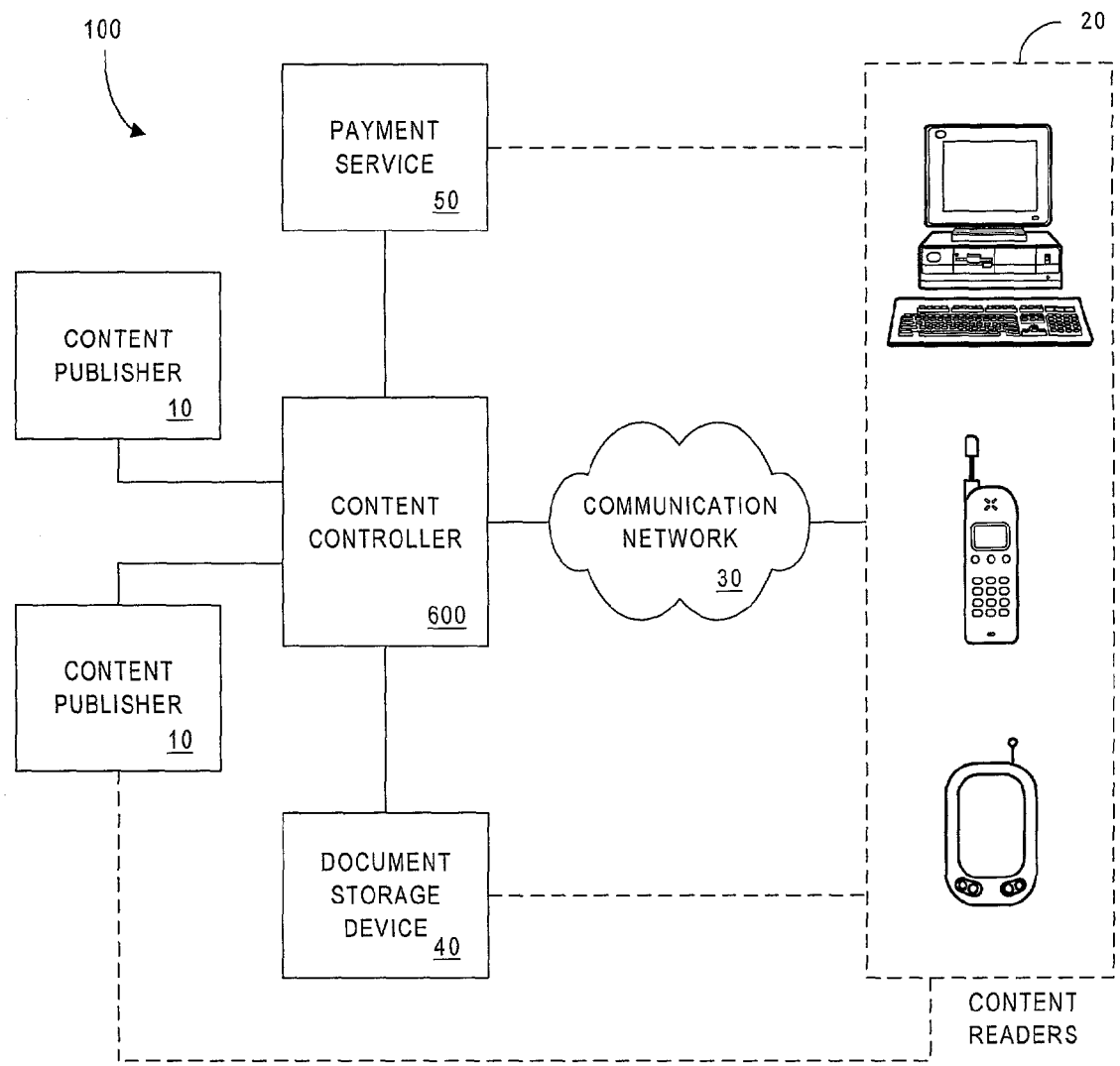
FIG. 1 is a block diagram overview of a content management system according to an embodiment of the present invention.

FIG. 1 is a block diagram of a content management system 100 according to one embodiment of the present invention. The content management system 100 includes a content controller 600 in communication with a number of content publishers 10 and content readers 20. As used herein, devices (e.g., the content controller 600 and the content readers 20) may communicate, for example, via a communication network 30, such as a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network (e.g., in accordance with an 802.11 standard), and/or an Internet Protocol (IP) network such as the Internet, an intranet, or an extranet. Note that the content controller 600 and the content publishers 10 can also communicate via one or more such communication networks.

Although a single content controller 600 is shown in FIG. 1, any number of content controllers 600 may be included in the content management system 100. Similarly, any number of content publishers 10, content readers 20, or any other device described herein may be included in the content management system 100 according to embodiments of the present invention.

The content controller 600, the content publishers 10, and the content readers 20 may be associated with any devices capable of performing the various functions described herein. The content controller 600 may comprise, for example, a Web server. A content reader 20 may be associated with, for example: a Personal Computer (PC), a portable computing device such as a Personal Digital Assistant (PDA), a wired or wireless telephone, or any other appropriate storage and/or communication device. A content publisher 10 may be associated with, for example, a Web server or a PC.

The content management system 100 may also include a document storage device 40, such as a local, remote, or distributed database system adapted to store a large number of documents.

According to an embodiment of the present invention, the content controller 600 receives documents from a number of different content publishers 10. For example, a content creator (e.g., an author or an automated process) may transmit documents to the content controller 600 via a content publisher 10. The content controller 600 also transmits documents to content readers 20 (e.g., in response to a customer's request or a pre-defined customer preference). According to some embodiments, a content reader 20 instead receives a document directly from a content publisher 10 and/or from the document storage device 40 (e.g., after receiving a relevant document identifier or link from the content controller 600). In either case, a document may be transmitted to a content reader 20, for example, via a Web site or an electronic mail message.

The content management system 100 may also include a payment service 50 (e.g., a credit card payment service) that can be used to arrange for a content reader 20 to provide payment in exchange for documents or in exchange for having his or her access to documents facilitated via the content management system 100. For example, a content reader 20 may provide a monthly subscription payment via a payment identifier such as a credit card, debit card, or bank account number or digital payment protocol information.

Note that some of devices illustrated in FIG. 1 may actually be incorporated in a single device. For example, the content controller 600 may also act as a content publisher 10 and/or a document storage device 40.

Document Tagging

According to some embodiments of the present invention, documents available via the content management system 100 are associated with one or more document tags. As used herein, the term "tag" refers to any information, such as an identifier, that may be used to categorize or otherwise provide information about a document or about content that may be of interest to a content reader 20.

Figure 2:
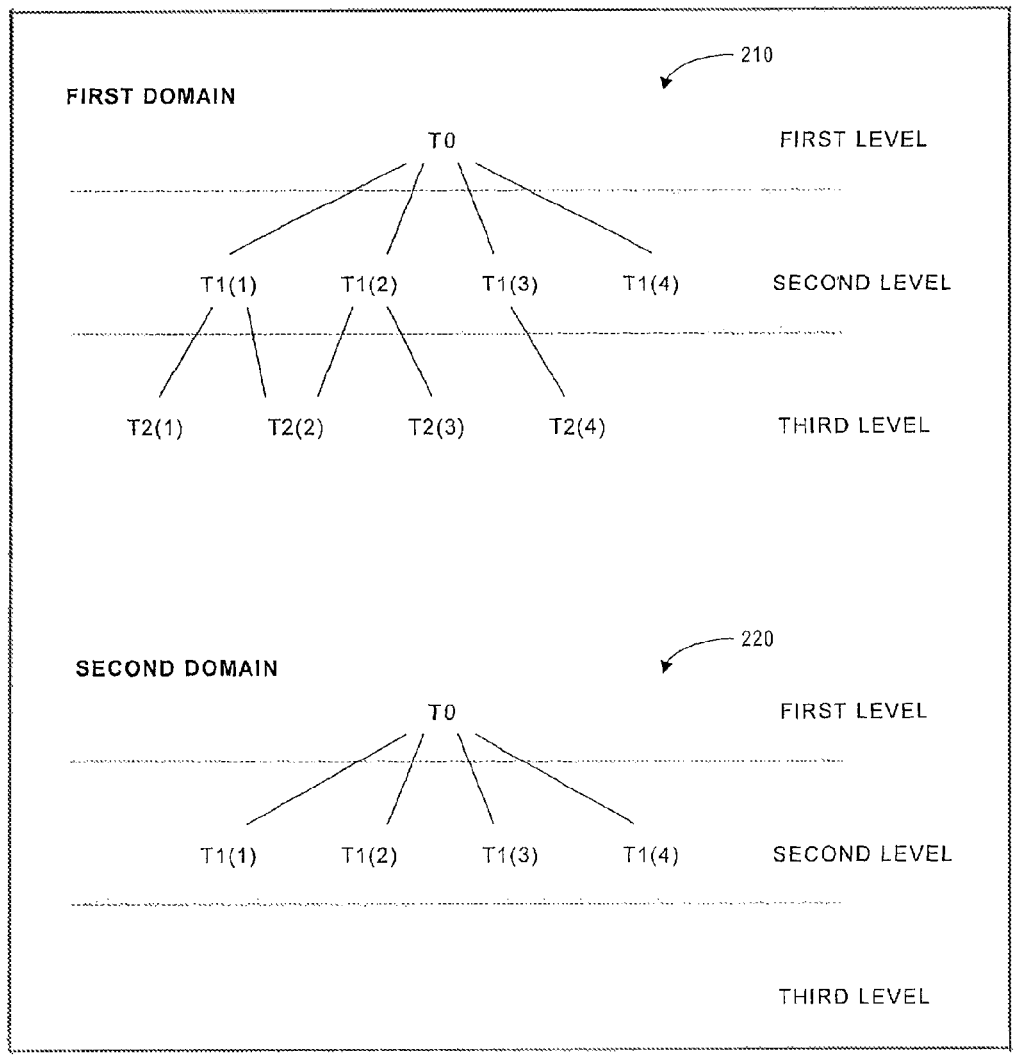
FIG. 2 illustrates tag domains according to some embodiments of the present invention.

According to one embodiment, a document tag is associated with a tag "domain," such as a single-rooted, hierarchical data structure. FIG. 2 illustrates two tag domains 210, 220 according to some embodiments of the present invention. As can be seen, the first tag domain 210 includes three levels. The first level includes a single tag (i.e., tag "T0") that has four descendent tags (i.e., child tags) in the second level: T1(1), T1(2), T1(3), and T1(4). Moreover, some of those second level tags have children in the third level. For example, tag T1(1) has two child tags in the third level: T2(1) and T2(2). Note that a tag may have more than one antecedent tag (e.g., parent tags). For example, tag T2(2) has both tag T1(1) and tag T1(2) as parent tags. In addition, a tag may not have any child tags. For example, tag T1(4) in the second level does not have any child tag in the third level.

As another example, the second tag domain 220 is "flat." That is, the entire domain consists of a single parent tag (i.e., tag "T0") and a number of child tags.

Although generic document tags are shown in FIG. 2, a document tag may be associated with any type of information associated with documents or with content that may be of interest to a content reader 20. For example, a tag domain may be associated with a document's creator (e.g., an author or an automated process). Consider the second tag domain 220 illustrated in FIG. 2. In this case, each tag in the second level could be associated with a different creator. Similarly, a document tag may be associated with a date on which a document's content was created. As another example, a document tag may indicate a content type. For example, a document tag may indicate whether a document was automatically generated or manually written by an author. A document tag might instead indicate whether a document includes image information or whether a document is appropriate for hand-held content readers 20.

A document tag may also indicate the nature of a document's content. For example, a tag may indicate that a document is related to a particular sector (e.g., the technology sector), an industry (e.g., the German automotive industry), a research type, a company (e.g., MICROSOFT CORP.®), an issuer, a region (e.g., North America), a country (e.g., Canada), an investment product, a security instrument, a third-party rating (e.g., a Moody's Investors Service rating), a research analyst, a strategist, an event type (e.g., an investor conference call), a subject, an investment style (e.g., value-based investing), a market cap, a content type, an information value, and/or a currency.

A document tag may also reflect other information about a document. For example, a document tag may indicate a change frequency (e.g., how often the document is normally updated), a business owner, a technology owner, a data source (e.g., a database identifier), and/or a change process (e.g., indicating that any change must be approved by the appropriate business owner).

The content controller 600 may assign a document tag to a document after receiving the document from a content publisher 10 along with an indication of an appropriate document tag. That is, the content publisher 10 (or a tag assignor associated with the content publisher 10) may determine the appropriate document tag (e.g., by selecting one or more tag descriptions via a graphical user interface). In this case, the content controller 600 can simply assign the first document tag to the document based on indication received from the content publisher 10.

According to another embodiment, the content controller 600 does not receive an indication of an appropriate document tag from the content publisher 10. In this case, the content controller 600 may determine one or more document tags. For example, a tag assignor associated with the content controller 600 may review the document to determine appropriate document tags. According to another embodiment, an automated process is used to automatically determine document tags (e.g., based on a key word analysis of the document's content).

According to one embodiment, a document tag can be associated with a document in different ways. For example, a document tag may be designated as a "primary" tag (e.g., indicating that the tag is an important subject of the document) or a "secondary" tag (e.g., indicating that tag is only somewhat related to the document).

Note that a plurality of document tags can be assigned to a single document, and these tags may belong to one or more tag domains. For example, a single document tag from an author tag domain (e.g., a "Rick Sherlund" tag) and three document tags from an industry tag domain (e.g., "Technology," "Software," and "Operating Systems" tags) could be assigned to a particular document.

Content Selection Tag Sets

Figure 3:
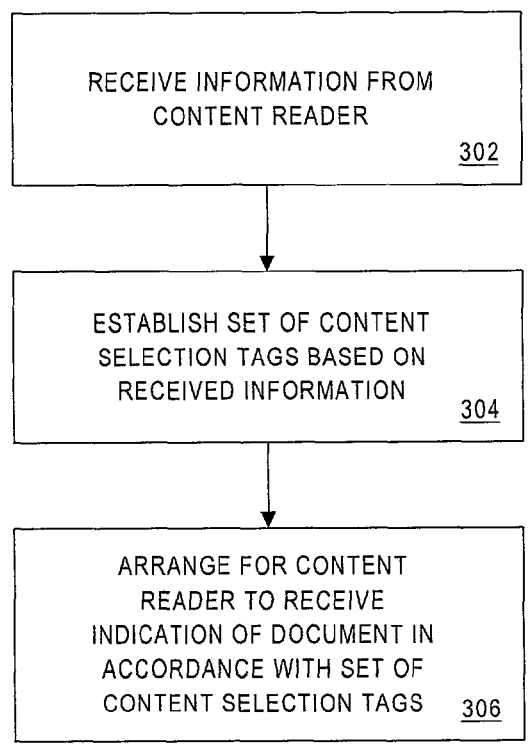
FIG. 3 is a flow chart of a method according to some embodiments of the present invention.

FIG. 3 is a flow chart of a method that may be performed by the content controller 600 according to some embodiments of the present invention. The flow charts described herein do not imply a fixed order to the steps, and embodiments of the present invention may be practiced in any order that is practicable.

At 302, information is received from a content reader 20. For example, the content controller 600 may receive information generated by (or at) the content reader 20 via a graphical user interface.

Figure 4:
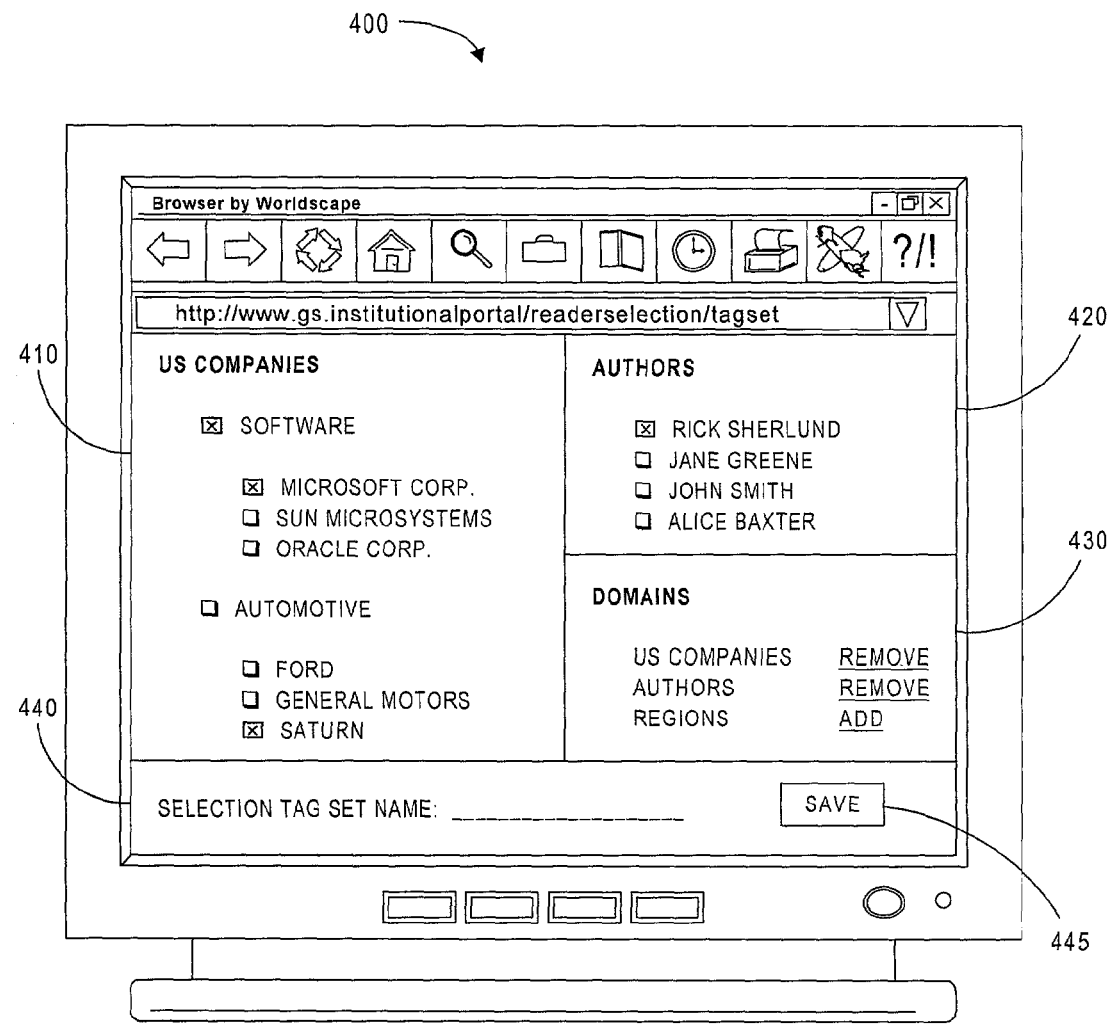
FIG. 4 illustrates a content reader display that may be used to define a set of content selection tags in accordance with some embodiments of the present invention.

FIG. 4 illustrates one example of content reader display 400 having such a graphical user interface. In particular, the display 400 includes two tag selection areas 410, 420—each being associated with a particular tag domain (i.e., a "US Companies" tag domain and an "Authors" tag domain, respectively). According to this embodiment, the tag selection areas 410, 420 are used to indicate the types of documents that are of interest to a content reader 20. For example, selecting the "SATURN®" tag in the "Automotive" tag domain (i.e., as indicated by an "X" in FIG. 4) indicates that documents associated with SATURN® are of interest to the content reader 20.

According to one embodiment, the selection of a particular tag does not automatically alter other tag selections (e.g., parent tags, sibling tags, and child tags). In such a case, selection of the "Automotive" tag would not automatically select the "FORD®" tag (nor would selection of the "FORD®" tag automatically select the "Automotive" tag). According to another embodiment, the selection of a particular tag will automatically alter other tag selections. For example, selecting a "North America" tag may automatically select a set of child tags (e.g., including a "Canada" tag). Note that the altered tag selection might be associated with a different tag domain. For example, selection of the "Rick Sherlund" tag in the "Authors" tag domain could automatically result in selection of the "MICROSOFT®" tag in the "US Companies" tag domain.

The display 400 also includes a tag domain selection area 430 that can be used to add or remove tag selection areas from the display 400 (e.g., selecting "add" for the "Region" tag domain would result in a third tag selection area being added to the display 400).

Referring again to FIG. 3, a set of content selection tags is established at 304 based on the information that was received at 302. According to one embodiment, the content reader 20 transmits the actual set of content selections to the content controller 600. According to another embodiment, the content reader 20 instead transmits other information (e.g., text information) that is used by the content controller 600 to establish the content selection tags (e.g., by translating text information into appropriate content selection tag identifiers)
.

According to some embodiments, each content selection tag in a set is associated with one or more hierarchical tag domains (e.g., multi-level tag domains having multiple content selection tags within domain levels). Note these tag domains may be substantially similar (or even identical) to the tag domains described herein with respect to document tagging. Moreover, the content selection tags may be associated with any of the information described herein with respect to document tagging, such as a content author, an industry, a company, and/or a change frequency.

Figure 5:
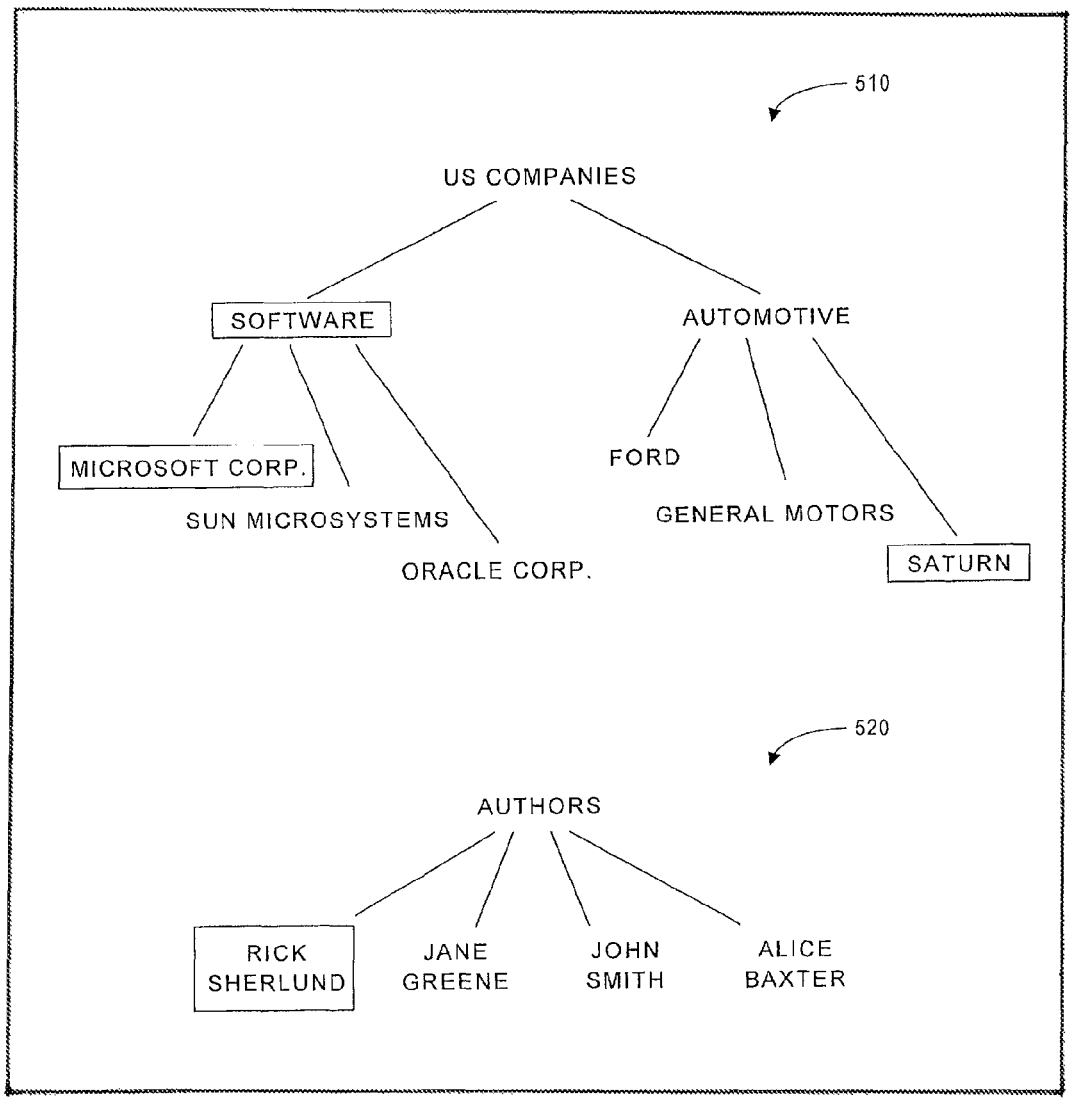
FIG. 5 illustrates an example of tag domains and a set of content selection tags according to one embodiment of the present invention.

For example, FIG. 5 illustrates two tag domains 510, 520 and a set of content selection tags. As can be seen, the first tag domain 510 comprises a "US Companies" tag having "Software" and "Automotive" as child tags. Moreover, the "Software" tag has "MICROSOFT CORP.®," "SUN MICROSYSTEMS®," and "ORACLE CORP.®" as child tags. The second tag domain 520 comprises an "Authors" tag having four child tags. Although only a small number of tags are shown in FIG. 5, any number of tags and/or tag domains may be defined by the content controller 600.

As shown with boxes, a set of four content selection tags have been established in FIG. 5 (i.e., the "Software," "MICROSOFT CORP.®," and "SATURN®" tags in the "US Companies" tag domain and the "Rick Sherlund" tag in the "Authors" tag domain).

According to one embodiment, pre-determined rules are used to define relationships between content selection tags. For example, tags within a domain may automatically be associated with a Boolean "OR" while tags from different domains may be associated with a Boolean "AND." In this case, the selections illustrated in FIG. 5 would be interpreted as follows:

("Software" OR "MICROSOFT®" OR "SATURN®") AND "Rick Sherlund"

According to another embodiment, these types of rules are instead be defined by a content reader 20. Note that relationships other than Boolean operations may be associated with the content selection tags (e.g., "if no document having Tag A is found, then display the three most recent documents that have Tag B without having Tag C").

Referring again to FIG. 3, it is arranged at 306 for the content reader 20 to receive an indication of one or more documents in accordance with the set of content selection tags. For example, the content controller 600 may select documents in accordance with the set of content selection tags and a set of document tags that were previously established in accordance with information received from a content publisher 10. According to some embodiments, the content controller 600 compares the content selection tags with primary and/or secondary document tags.

After selecting the appropriate documents, the content controller 600 may then transmit an indication of the document to the content reader 20 (e.g., by transmitting a document title, a document abstract, a document link, or the document itself to the content reader 20 via a Web site).

In addition to the content selection tags and document tags, appropriate documents may be selected by the content controller 600 based on, for example, a content reader preference (e.g., a predefined set of content selection tags that is always associated with a particular content reader 20 or a content reader category), a content reader request (e.g., a one-time request made by a content reader 20), and/or an entitlement tag (e.g., information generated by the content controller 600 or a content publisher 10 indicating documents that a content reader 20 is allowed to access).

According to some embodiments, a set of content selection tags is stored in association with the content reader 20. The set may be stored, for example, at the content controller 600 and/or at the content reader 20 (e.g., via a browser program "cookie" file). Referring again to FIG. 4, the display 400 includes a storage frame 440 that can be used to store a set of content reader selections (e.g., by providing a tag set name and activating a "save" icon 445). In this way, the set of content selection tags can later be used to select document for the content reader 20. In addition, the content reader 20 can access the set of content selection tags to modify the information and/or completely delete the content selection tag set. Moreover, a single content reader 20 may be associated with a number of different sets of content selection tags (e.g., saved with unique tag set names).

Content Controller

Figure 6:
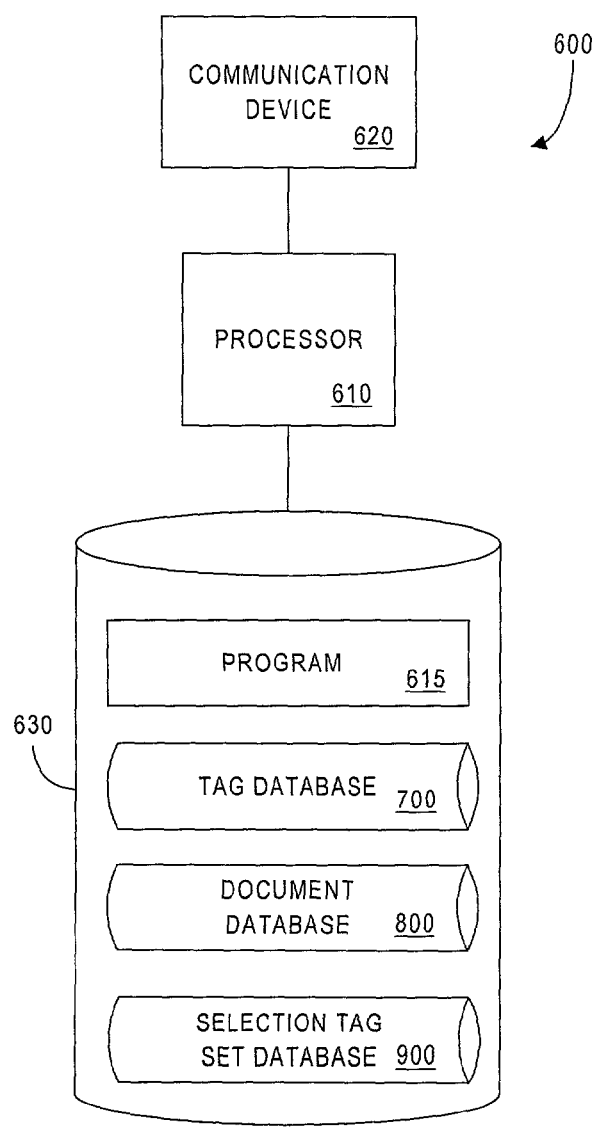
FIG. 6 is a block diagram of a content controller according to one embodiment of the present invention.

FIG. 6 illustrates a content controller 600 that is descriptive of the device shown, for example, in FIG. 1 according to an embodiment of the present invention. The content controller 600 comprises a processor 610, such as one or more INTEL® Pentium® processors, coupled to a communication device 620 configured to communicate via a communication network 30 (not shown in FIG. 6). The communication device 620 may be used to communicate, for example, with one or more content publishers 10, content readers 20, document storage devices 40, and/or payment services 60. According to one embodiment, the communication device 620 is also used to communicate with other content controllers.

The processor 610 is also in communication with a storage device 630. The storage device 630 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 630 stores a program 615 for controlling the processor 610. The processor 610 performs instructions of the program 615, and thereby operates in accordance with the present invention. For example, the processor 610 may receive information from a content reader 20 and establish a set of content selection tags based on the received information. The processor 610 can then arrange for the content reader 20 to receive an indication of a document in accordance with the set of content selection tags.

According to another embodiment, the processor 610 receive from a content reader 20 an indication of a first content selection tag set via a graphical user interface. Note that the first content selection tag set may be adapted to facilitate identification of a first investment research document in accordance with a first document tag set. For example, the first content selection tag set may be associated with tag domains that are identical (or substantially similar) to the tag domains used with respect to the first document tag set. Such an approach may simplify the processing required to identify documents that will be of interest to a content reader 20.

The processor 610 also receives from the content reader 20 an indication of a second content selection tag set, the second content selection tag set being similarly adapted to facilitate identification of a second investment research document in accordance with a second document tag set. The processor 610 then arranges for an indication of the first investment research document to be displayed via a first portion of a content reader display (e.g., a first display frame or window) and for an indication of the second investment research document to be displayed via a second portion of the content reader display.

As used herein, information may be "received" by or "transmitted" to, for example: (i) the content controller 600 from a content publisher 10 or a content reader 20; or (ii) a software application or module within the content controller 600 from another software application, module, or any other source.

As shown in FIG. 6, the storage device 630 also stores: a tag database 700 (described with respect to FIG. 7); a document database 800 (described with respect to FIG. 8); and a selection tag set database 900 (described with respect to FIG. 9). Examples of databases that may be used in connection with the content management system 100 will now be described in detail with respect to FIGS. 7 through 9. The illustrations and accompanying descriptions of the databases presented herein are exemplary, and any number of other database arrangements could be employed besides those suggested by the figures.

Tag Database

Figure 7:
FIG. 7 is a tabular representation of a portion of a tag database according to one embodiment of the present invention.

Referring to FIG. 7, a table represents the tag database 700 that may be stored at the content controller 600 according to an embodiment of the present invention. The table includes entries identifying tags that can be associated with a document (e.g., as a primary or secondary tag) and/or with a content reader 20 (e.g., reflecting documents that may be of interest to the content reader 20). The table also defines fields 702, 704, 706 for each of the entries. The fields specify: a tag identifier 702, a description 704, and a parent tag 706. The information in the tag database 700 may be created and updated based on information received from an administrator associated with the content controller 600.

The tag identifier 702 may be an alphanumeric code that can be associated with a document or a content reader 20, and the description 704 may describe the meaning of the tag. According to one embodiment, the description 704 includes text, graphical, and/or audio information that is provided to a content reader (e.g., to help the content reader 20 select appropriate tags). The parent tag 706 indicates the parent or parents of the tag in a hierarchical data structure.

Note that the tag identifier 702 may be based on the tag's position in the hierarchical data structure. Consider for example, a tag domain associated with document authors. In this case, each tag identifier may begin with "T-A" followed by a number representing a level within the author tag domain. Similarly, tag identifiers in an industry tag domain may begin with "T-I," and tag identifiers in a company tag domain may begin with "T-C."

Moreover, the first level of the author tag domain may consist of a single "T-A0" tag identifier (e.g., with "0" representing the first level). The "T-A1(1)" tag identifier associated with "Author-Analyst" (as shown by the first entry in FIG. 7) would then be a child of the "T-A0 tag" identifier in the second level (e.g., as reflected by the parent tag 706). Similarly, the "T-A2(1)" tag identifier associated with "Author-Analyst-Rick Sherlund" is a child of the "T-A 1(1)" tag identifier. Of course, any number of other methods may be used instead to indicate a tag's position in one or more one or more tag domains and/or tag domain levels.

Document Database

Figure 8:
FIG. 8 is a tabular representation of a portion of a document database according to one embodiment of the present invention.

Referring to FIG. 8, a table represents the document database 800 that may be stored at the content controller 600 according to an embodiment of the present invention. The table includes entries identifying documents that may be accessed via the content management system 100. The table also defines fields 802, 804, 806, 808 for each of the entries. The fields specify: a document identifier 802, a description 804, primary tags 806, and secondary tags 808. The information in the document database 800 may be created and updated based on information received from content publishers 10.

The document identifier 802 may be, for example, an alphanumeric code associated with a document that can be accessed via the content management system 100. The description 804 may describe the contents of the document. According to one embodiment, the description 804 includes text, graphical, and/or audio information that may be provided to a customer via a content reader 20 (e.g., to describe the content of the document to the content reader 20). According to another embodiment, the document itself (or a pointer to the document) is also stored in the document database 800.

The primary tags 806 and the secondary tags 808 reflect the document tags that are currently assigned to the document. Note that the primary tags 806 and the secondary tags 808 may be based on, or associated with, the tag identifiers stored 702 in the tag database 700. According to one embodiment, only a single set of document tags are stored for each document (e.g., there is no distinction between "primary" and "secondary" tags). According to another embodiment, each document tag is associated with a "weight." For example, a weight from 1 through 10 may be assigned to each document tag (instead of only categorizing document tags as primary or secondary).

Selection Tag Set Database

Referring to FIG. 9, a table represents the selection tag set database 900 that may be stored at the content controller 600 according to an embodiment of the present invention. The table includes entries identifying sets of content selection tags that can be used to retrieve documents that are likely to be of interest to a content reader 20. The table also defines fields 902, 904, 906, 908 for each of the entries. The fields specify: a selection tag set identifier 902; a content reader identifier 904; selection tags 906; and document identifiers 908. The information in the tag association database 900 may be created and updated, for example, based on information received from a content reader 20.

The selection tag set identifier 902 may be, for example, an alphanumeric code associated with a set of content selection tags that can be used to retrieve one or more documents that are likely to be of interest to a content reader 20 associated with the content reader identifier 904. The selection tag set identifier 902 and/or content reader identifier 904 may be generated by the content controller 600. According to another embodiment, the selected tag set identifier 902 is generated by the content reader 20 (e.g., when he or she assigns a tag set name). Similarly, the content reader identifier 904 may be generated by the content reader 20 (e.g., when he or she selects a user name and password).

The selection tags 906 indicate one or more content selection tags and the relationship between those tags (e.g., Boolean relationships). The selection tags 906 may be based on, or associated with, the tag identifiers 702 and parent tags 706 stored in the tag database and/or the primary tags 806 and secondary tags 808 stored in the document database 800.

The document identifiers 908 indicate one or more documents that may be of interest to the content reader 20 and may be based on, or associated with, the document identifiers 802 stored in the document database 800. The document identifiers 908 may be determined, for example, by comparing the selection tags 906 with the primary tags 806 and secondary tags 808 stored in the document database 800. For example, as illustrated by the first entry in FIG. 9, document "D001" has been stored as a document identifier 908 because both "T-A2(1)" and "T-C4(7)" are primary tags 806 for that document in the document database 800 (as illustrated by the first entry in FIG. 8). In other words, because the author of the document is an investment advisor named "Rick Sherlund" (as illustrated by the third entry in FIG. 7) and the associated company is "MICROSOFT®" (as illustrated by the last entry in FIG. 7), the document described as "MICROSOFT 2002 Q3" may be of interest to the content reader identified as "CR-1001").

Note that a single content reader may be associated with more than one set of content selection tags (as illustrated by the first and second entries in FIG. 9).

Content Management System Methods

Figure 10:
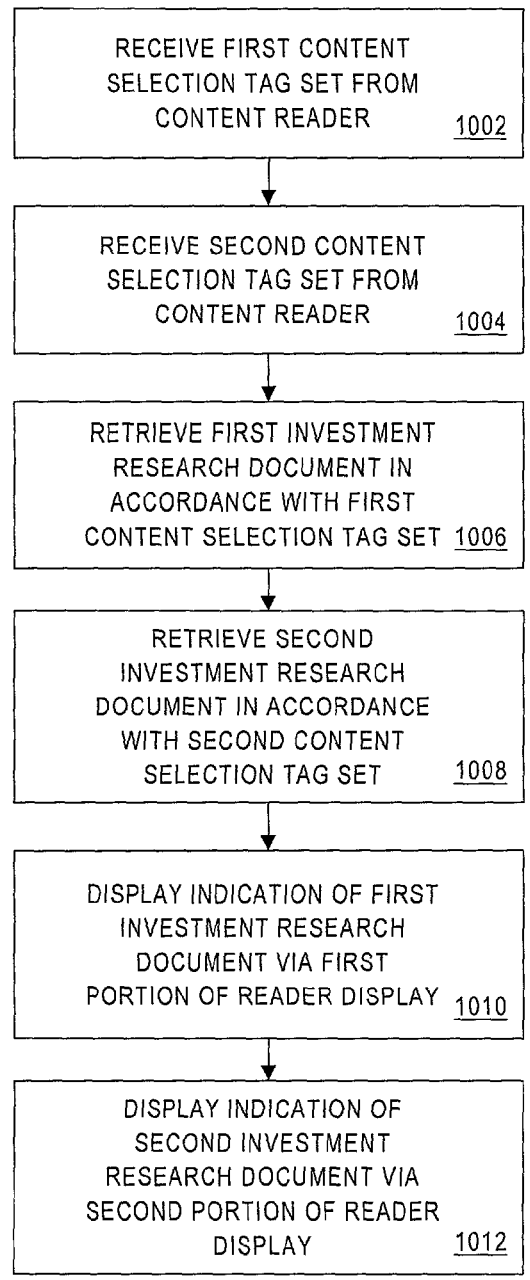
FIG. 10 is a flow chart of a computer-implemented method of facilitating access to investment research documents according to some embodiments of the present invention.

FIG. 10 is a flow chart of a computer-implemented method of facilitating access to investment research documents according to some embodiments of the present invention. The method may be performed, for example, by the content controller 600. At 1002, an indication of a first content selection tag set is received from a content reader 20 via a graphical user interface. For example, the content controller 600 may receive the first content selection tag set via a display such as the one illustrated in FIG. 4. Note that the content selection tag set may be received by the content controller 600 on a tag-by-tag basis or as a single, complete set. At 1004, an indication of a second content selection tag set is received from the content reader 20. The content controller 600 may then store the appropriate content reader identifier 904 and selection tags 906 in the selection tag set database 900.

At 1006, a first investment research document is retrieved in accordance with the first content selection tag set and a first document tag set. At 1008, a second investment research document is retrieved in accordance with the second content selection tag set and a second document tag set. For example, the content controller 600 may retrieve the first and second research documents (e.g., indications of or links to those documents) from the document database 800 in accordance with the selection tags 906, the primary tags 806, and/or the secondary tags 808.

It is then arranged for an indication of the first investment research document to be displayed to the content reader 20 via a first portion of a reader display at 1010. Similarly, it is arranged for an indication of the second investment research document to be displayed to the content reader 20 via a second portion of a reader display. For example, the content controller 600 may transmit the indications of the first and second investment research documents to the content reader 20.

Figure 11:
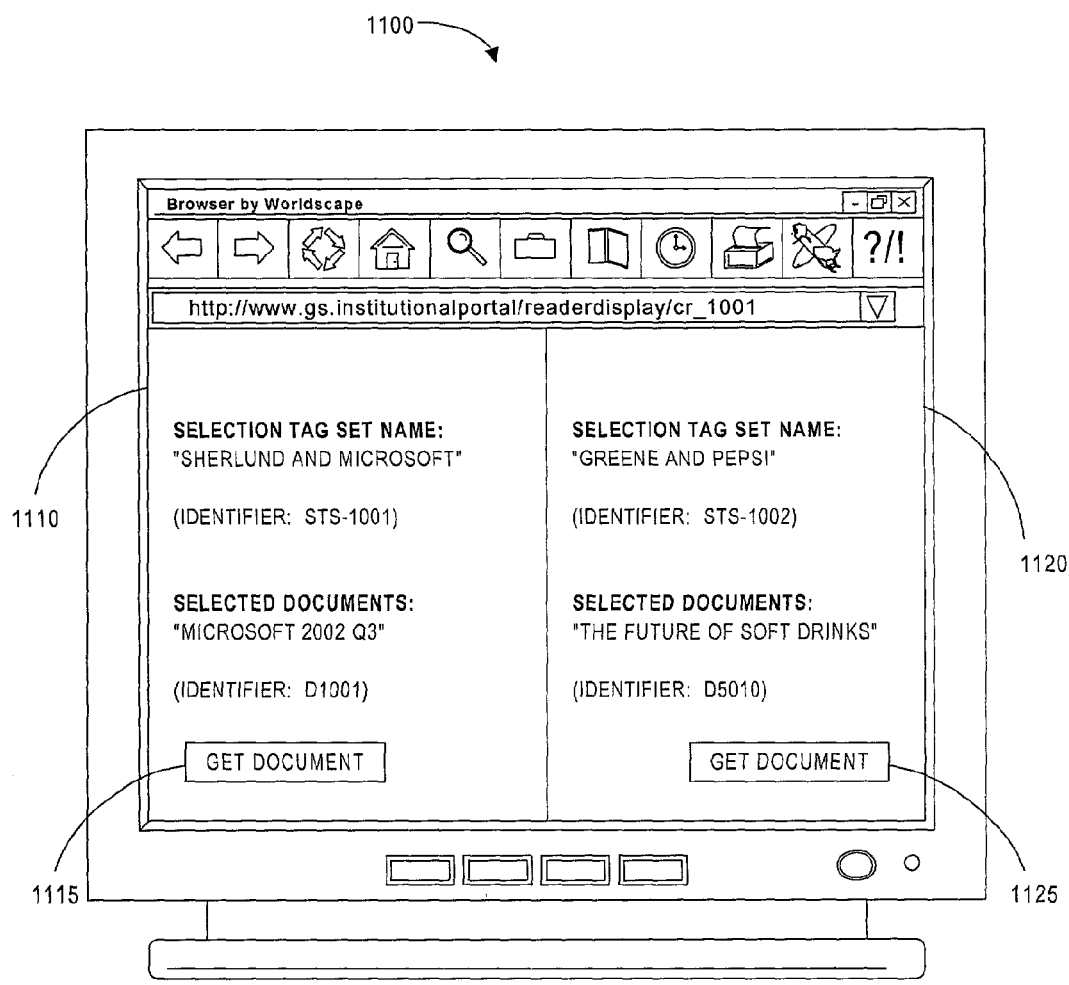
FIG. 11 illustrates a content reader display in accordance with some embodiments of the present invention.

FIG. 11 illustrates a content reader display 1100 in accordance with this embodiment of the present invention. As can be seen, an indication of a first investment research document (determined based on a selection tag set named "Sherlund and MICROSOFT®") is displayed in a first portion 1110 while an indication of a second investment research document (determined based a selection tag set named "Greene and PEPSIS") is displayed in a second portion 1120. The content reader 20 may then request to receive the first or second document by activating one of the "get document" icons 1115, 1125. In this way, the content reader 20 can simultaneously monitor different topics that are of interest. Of course, documents associated with different sets of content selection tags could instead be displayed in a single, combined display (e.g., in chronological order).

Figure 12:
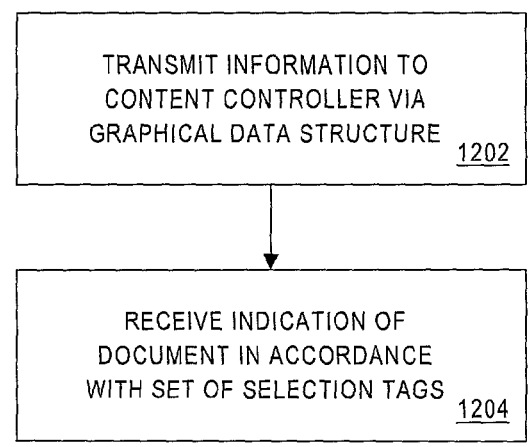
FIG. 12 is a flow chart of a method that may be performed by a content reader according to some embodiments of the present invention.

FIG. 12 is a flow chart of a method that may be performed by a content reader 20 according to some embodiments of the present invention. At 1202, information is transmitted to a content controller 600 via a graphical user interface. For example, the information may be transmitted to the content controller 600 via a display such as the one illustrated in FIG. 4.

At 1204, an indication of a document is received in accordance with a set of content selection tags established based on the transmitted information, each content selection tag in the set being associated with a hierarchical tag domain. For example, one or more documents associated with the set of content selection tags may be provided via a display such as the one illustrated in FIG. 11.

Figure 13:
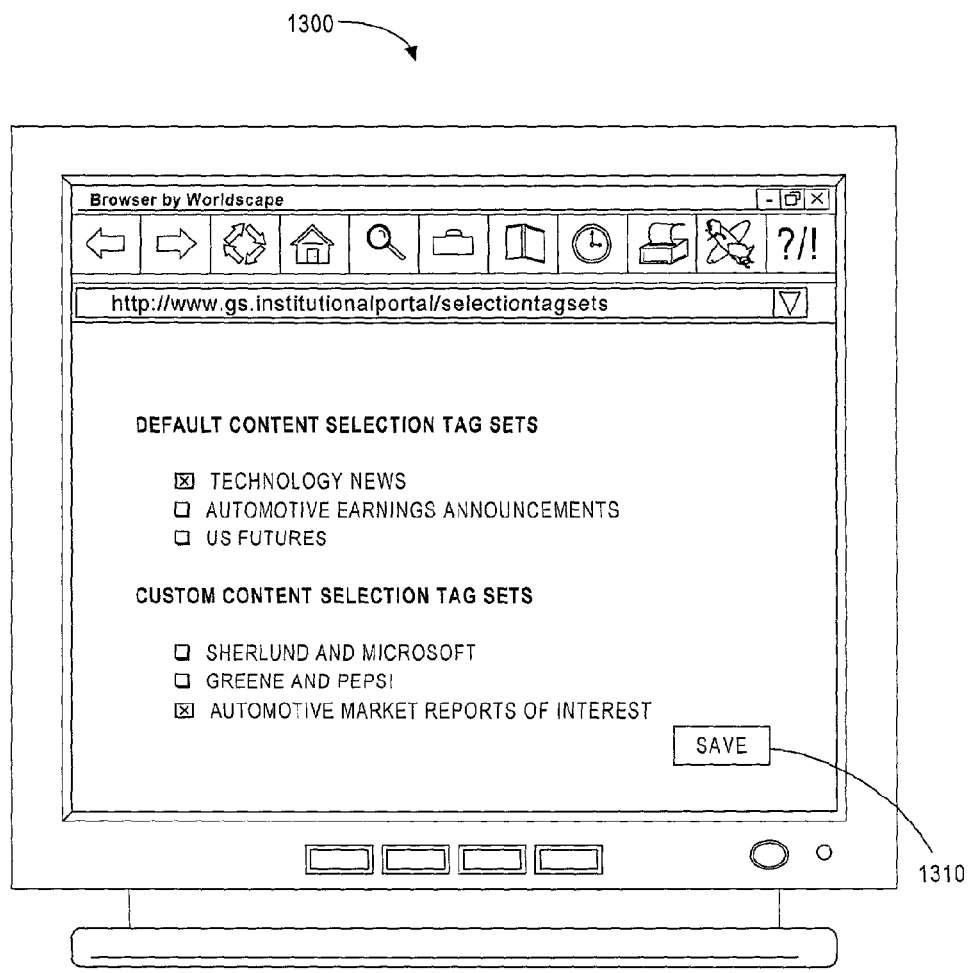
FIG. 13 illustrates a content reader display that may be used to activate content selection tag sets in accordance with some embodiments of the present invention.

As described with respect to FIG. 10, a single content reader 20 may simultaneously monitor a number of different topics using different sets of content selection tags (e.g., sets that were defined, named, and stored via a display such as the one illustrated in FIG. 4). In this case, a content reader 20 may be able to activate and/or deactivate various sets of content selection tags. For example, FIG. 13 illustrates a content reader display 1300 that can be used to activate and/or deactivate content selection tag sets in accordance with some embodiments of the present invention. In this case, selecting the "Automotive Market Reports of Interest" content selection tag set (i.e., as indicated by an "X" in FIG. 13) results in documents having document tags that satisfy that tag set being indicated to the content reader 20 (and presumably those documents will be of interest to the content reader 20). The content reader 20 can also deactivate a content selection tag set and/or save his or her current preferences (e.g., by activating the "save" icon 1310).

Note that a number of "default" content selection tag sets may be available (e.g., after being defined by an administrator associated with the content controller 600) in addition to the "custom" content selection tag sets that were defined by the content reader 20.

ADDITIONAL EMBODIMENTS

The following illustrates various additional embodiments of the present invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although many of the embodiments described herein are associated with documents that contain financial information, the present invention can also be used with respect to other types of information. For example, content selection tags in one or more tag domains may be associated with general news documents, entertainment information, and/or products that can be purchased by customers (e.g., advertisements).

Moreover, although many embodiments include a content controller 600 that retrieves and transmits documents, according to other embodiments these functions are instead performed by other devices (e.g., content publishers 10 and/or content readers 20 via a peer-to-peer protocol). According to another embodiment, the content controller 600 is associated with a third-party service (e.g., a service that organizes information for a number of different content providers).

Note that the relationships between documents and tag domains could be maintained in any number of ways. For example, one or more document identifiers could be stored in a tag domain database (i.e., instead of storing tag identifiers in a document database). Also note that document tags may associated with existing information protocols, such as Extensible Markup Language (XML) protocols.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A processor implemented method of accessing documents, comprising:
    identifying content selection data;
    determining by a processor a set of content selection tags based on the content selection data;
    receiving document tags from at least one of a plurality of content publishers based on the content selection tags;
    generating at least one hierarchical tag domain association for each of the content selection tags in the set;
    generating at least one relationship between the content selection tags in the set in accordance with a predetermined rule associated with the at least one hierarchical tag domain;
    selecting at least one document by comparing the document tags with the set of content selection tags having at least one relationship and the at least one hierarchical tag domain, wherein the set of content selection tags is stored in association with a reader-defined name; and
    displaying at least one indication of the at least one document.

2. The method of claim 1, wherein the set of content selection tags is associated with a content request.

3. The method of claim 1, wherein the set of content selection tags is associated with an entitlement tag, the entitlement tag comprising information generated by at least one of the plurality of content publishers indicating documents allowed to be accessed.

4. The method of claim 1, wherein at least one tag domain comprises a multilevel domain, and at least one domain level is associated with a plurality of content selection tags.

5. The method of claim 1, wherein the content selection tags are further associated with Boolean operations in accordance with the content selection data.

6. The method of claim 1, wherein at least one content selection tag is associated with at least one of: (i) a content author, (ii) a content date, or (iii) a content type.

7. The method of claim 1, wherein at least one content selection tag includes: (i) a sector, (ii) an industry, (iii) a research type, (iv) a company, (v) an issuer, (vi) a region, (vii) a country, (viii) an investment product, (ix) security, (x) a third-party rating, (xi) a research analyst, (xii) a strategist, (xiii) an event type, (xiv) a subject, (xv) an investment style, (xvi) a market cap, (xvii) a document type, (xviii) an information value, or (xix) a currency.

8. The method of claim 1, wherein the set of content selection tags is adapted to facilitate selecting the document in accordance with a set of document tags.

9. The method of claim 8, wherein the set of documents tags are established in accordance with information received from a content publisher via a graphical user interface.

10. The method of claim 8, wherein document tags are associated with hierarchical tag domains similar to the tag domains associated with the set of content selection tags.

11. The method of claim 8, wherein at least one document tag comprises at least one of: (i) a primary tag, or (ii) a secondary tag.

12. The method of claim 8, wherein the document comprises content to be provided to a user via a communication network.

13. The method of claim 12, wherein the communication network comprises at least one of: the Internet, an intranet, a public network, a public switched telephone network, a proprietary network, a wireless network, and a local area network.

14. The method of claim 12, wherein the document comprises at least one of: text content, image content, audio content, and executable content.

15. The method of claim 12, wherein the content comprises at least one of: financial information, financial news, information about financial events, investment information, and market information.

16. The method of claim 1, wherein the set of content selection tags comprises a first set of content selection tags, the method further comprising:
    accessing additional information;
    determining a second set of content selection tags based on the additional information; and
    storing the second set of content selection tags.

17. The method of claim 16, wherein the first set of content selection tags is associated with a first portion of a reader display and the second set of content selection tags is associated with a second portion of the reader display.

18. The method of claim 16, further comprising:
    selecting at least one of the first and second sets of content selection tags; and
    displaying at least one indication of at least one document in accordance with the selected set of content selection tags.

19. The method of claim 1, wherein the document tags are associated with a weight according to a relevance to the documents.

20. An apparatus, comprising:
    a processor; and
    a storage device in communication with said processor and storing instructions adapted to be executed by said processor to:
    identify content selection data;
    determine a set of content selection tags based on the content selection data;
    receive document tags from at least one of a plurality of content publishers based on the content selection tags;
    generate at least one hierarchical tag domain association for each of the content selection tags in the set;
    generate at least one relationship between the content selection tags in the set in accordance with a predetermined rule associated with the at least one hierarchical tag domain;
    select at least one document by comparing the document tags with the set of content selection tags having at least one relationship and the at least one hierarchical tag domain, wherein the set of content selection tags is stored in association with a reader-defined name; and display indication of the at least one document.

21. A non-transitory computer readable medium storing computer executable instructions for causing a computer to:

identify content selection data;

determine a set of content selection tags based on the content selection data;

receive document tags from at least one of a plurality of content publishers based on the content selection tags;

generate at least one hierarchical tag domain association for each of the content selection tags in the set;

generate at least one relationship between the content selection tags in the set in accordance with a predetermined rule associated with the at least one hierarchical tag domain;

select at least one document by comparing the document tags with the set of content selection tags having at least one relationship and the at least one hierarchical tag domain, wherein the set of content selection tags is stored in association with a reader-defined name; and display indication of the at least one document.

* * * * *